(12) United States Patent
Hourn et al.

(10) Patent No.: US 10,190,193 B2
(45) Date of Patent: Jan. 29, 2019

(54) LEACHING OF MINERALS

(71) Applicant: Glencore Technology PTY LTD, Brisbane, Queensland (AU)

(72) Inventors: Michael Matthew Hourn, Carindale (AU); Daniel Mallah, Brisbane (AU); Paul Voigt, Brisbane (AU); Duncan Turner, Brisbane (AU)

(73) Assignee: GLENCORE TECHNOLOGY PTY LTD (AU)

( * ) Notice: Subject to any disclaimer, the term of this patent is extended or adjusted under 35 U.S.C. 154(b) by 216 days.

(21) Appl. No.: 15/030,907

(22) PCT Filed: Oct. 21, 2014

(86) PCT No.: PCT/AU2014/050297
§ 371 (c)(1),
(2) Date: Apr. 21, 2016

(87) PCT Pub. No.: WO2015/058257
PCT Pub. Date: Apr. 30, 2015

(65) Prior Publication Data
US 2016/0258038 A1    Sep. 8, 2016

(30) Foreign Application Priority Data
Oct. 21, 2013    (AU) ................. 2013904052

(51) Int. Cl.
| C22B 1/11 | (2006.01) |
| C22B 3/12 | (2006.01) |
| C22B 3/14 | (2006.01) |
| C22B 1/14 | (2006.01) |
| C22B 3/00 | (2006.01) |
| C21B 15/00 | (2006.01) |
| C22B 30/04 | (2006.01) |
| C22B 34/22 | (2006.01) |
| C22B 34/24 | (2006.01) |

(52) U.S. Cl.
CPC .............. C22B 30/04 (2013.01); C21B 15/00 (2013.01); C22B 1/11 (2013.01); C22B 1/14 (2013.01); C22B 3/12 (2013.01); C22B 3/14 (2013.01); C22B 11/04 (2013.01); C22B 34/22 (2013.01); C22B 34/24 (2013.01)

(58) Field of Classification Search
CPC .... C22B 3/12; C22B 3/14; C22B 3/10; C22B 1/11
See application file for complete search history.

(56) References Cited

U.S. PATENT DOCUMENTS

| 4,559,209 A | 12/1985 | Muir et al. | |
| 5,961,940 A | 10/1999 | Sandstrom et al. | |
| 7,488,370 B2 * | 2/2009 | Hourn | C22B 1/00 75/733 |
| 2009/0022639 A1 * | 1/2009 | Poijarvi | C22B 3/08 423/24 |
| 2009/0293680 A1 | 12/2009 | Ritchie et al. | |
| 2013/0089378 A1 * | 4/2013 | Theodore | C22B 3/06 405/128.5 |

OTHER PUBLICATIONS

National Center for Biotechnology Information. PubChem Compound Database; CID=11029, https://pubchem.ncbi.nlm.nih.gov/compound/11029 (accessed Jan. 17, 2018). (Year: 2015).*
International Search Report and Written Opinion dated Jan. 23, 2015 for International Application No. PCT/AU2014/050297.

* cited by examiner

*Primary Examiner* — George Wyszomierski
*Assistant Examiner* — Tima M McGuthry-Banks
(74) *Attorney, Agent, or Firm* — Perkins Coie LLP

(57) ABSTRACT

A method for treating a mineral composition containing iron, arsenic or other Group VA compounds comprises milling the mineral composition to a particle size of $P_{80}$ of less than 25 μm and leaching the mineral composition in the presence of lime and/or limestone and a soluble alkali complexing agent and in the presence of an oxygen containing gas at a pH in the range of from 3.5 to 6.

17 Claims, No Drawings

LEACHING OF MINERALS

TECHNICAL FIELD

This application is a 35USC § 371 U.S. National Stage Application of International Patent Application No. PCT/AU 2014/050297, filed Oct. 21, 2014, entitled "Leaching of Minerals," which claims priority to Australian Patent Application Serial No. 2013904052, filed Oct. 21, 2013, the entire contents of which are incorporated herein by reference and relied upon.

The present invention relates to a method for processing a mineral composition.

BACKGROUND ART

It will be clearly understood that, if a prior art publication is referred to herein, this reference does not constitute an admission that the publication forms part of the common general knowledge in the art in Australia or in any other country.

Gold is generally extracted from gold containing ores by treatment with cyanide solution, which solubilises the gold. However, in some ores, the gold is present as microparticles encapsulated within the ore. The gold in such ores cannot be extracted by traditional cyanidation techniques. These types of ores are known as refractory ores and are typically sulphide and/or carbonaceous ores. These ores may also contain, along with sulphides, other compounds of other Group VIA elements such as selenium and tellurium and the Group VA elements such as Sb and Bi.

In order to extract gold from refractory sulfide ores, the ores must first be treated to liberate the gold so as to be accessible to cyanide leaching. A refractory ore is typically treated by oxidizing the ore which results in the chemical destruction of the refractory component of the ore, liberating precious metals for subsequent recovery. Known methods of oxidising refractory ores include roasting, bacterially assisted leaching and leaching the ore at elevated temperatures and pressure under acidic conditions.

Leaching of nickel and cobalt under alkaline conditions using ammonia/ammonium salts is known. However, a major disadvantage of alkaline leaching is that when iron and arsenic containing ores such as pyrite and arsenopyrite are oxidised, the iron and arsenic which are leached precipitate as a passive oxide and/or sulphur rich layer on the mineral particle. This layer inhibits further oxidation with the result being that the extent of leaching under alkaline conditions is less than under acidic conditions. This translates to a lower recovery of precious metals.

Still further, alkaline leaching of refractory materials requires elevated pressure and temperatures and an oxidant for the leaching to occur. However, even under aggressive alkaline conditions, recovery of precious metals is often less than that for acid leaching. Further, base metals such as copper and zinc are insoluble at high pH. Thus, alkaline leaching is unsuitable for leaching ores or concentrates where recovery of base metals from base metal sulphides such as chalcocite, sphalerite or chalcopyrite is required. For these reasons, commercial and academic interest has been directed towards acid leaching.

Most of the literature relating to alkaline leaching is directed towards the use of water soluble alkalis such as sodium or potassium hydroxide and ammonia. A disadvantage with these reagents is that iron is precipitated primarily as jarosite. Jarosite inhibits gold recovery and is also an environmentally unacceptable residue. Also, hydroxide reagents and in particular sodium hydroxide are prohibitively expensive.

The use of cheaper alkalis such as lime has been proposed. However, to date, leaching of iron sulphide materials with lime has been unsuccessful in that leaching is incomplete and subsequent precious metal recovery is low. For example, an earlier study of alkaline oxidation of pyrite for gold recovery using lime achieved only 30 to 40% gold recovery which offered little improvement over direct cyanidation of the pyrite. This is believed to be due to passivation of the mineral by precipitation of a gypsum/iron oxide layer.

Limestone is another alkali which is relatively cheap. Limestone is typically used in the neutralization of acidic leachates. However, limestone is considered to be insufficiently reactive and/or soluble in alkaline systems to be able to be used for alkaline leaching.

As mentioned above, it is known that the oxidation rate under acidic conditions can be increased by fine grinding to increase the surface area of the mineral particles. Such an increase may be predicted given that there is a larger surface area exposed to the oxidizing agents. However in the alkaline system, this effect is substantially reduced in view of the formation of the passive oxide and/or sulphur rich layer on the particles. The rate determining factors in the alkaline systems are believed to relate to the formation of the passivating oxide and/or sulphur rich layer and diffusion of reactants through the layer. Thus, workers in the field have concentrated on increasing the extent of alkaline leaching by using strong, soluble alkalis, by modifying the leaching conditions so as to minimise formation of the passive layer and/or influence the diffusion rate through the layer.

One study suggests leaching at higher temperatures or at relatively concentrated solutions of reagents. The reason for this is to rapidly produce a passive layer which is unstable and subject to cracking. It is believed that at lower temperatures, the layers grow more slowly and are more stable. Another suggestion has been to use additives which may react to dissolve the layer or to make the layer more permeable.

In Australian patent number 744356 (which corresponds to U.S. Pat. No. 6,833,021), the entire contents of which are herein incorporated by cross-reference, a method of processing a mineral composition comprising a refractory material is disclosed. The method comprises milling the composition to a particle size of $P_{80}$ of less than 25 μm and leaching the composition with a solution comprising lime and/or limestone in the presence of an oxygen containing gas. The specific conditions disclosed in this patent for processing the mineral composition include conducting the leaching step at a pH of from 6 to 12, or preferably from 6 to 9. The examples given in this patent utilise a pH of 8, 9 or 10 in the leaching step. The alkaline material added to the leaching step in the examples of this patent comprises lime or a mixture of lime and limestone. The method is described as being useful for recovering precious metals from a mineral composition comprising a refractory material. The method of this patent is described as being useful for treating mineral compositions that include pyrite or arsenopyrite.

SUMMARY OF INVENTION

It is an object of the present invention to provide a method for treating a mineral composition containing arsenic or arsenic compounds that results in enhanced recovery of desirable minerals.

According to a first aspect, the present invention provides a method for treating a mineral composition containing iron, arsenic or other Group VA compounds comprising milling the mineral composition to a particle size of $P_{80}$ of less than 25 μm and leaching said mineral composition in the presence of lime and/or limestone and a soluble alkali complexing agent and in the presence of an oxygen containing gas at a pH in the range of from 3.5 to 6.

In one embodiment, in the method of the present invention, a complexing agent that forms a soluble complex with iron, arsenic or other Group VA compounds is present during the leaching. The complexing agent may be the soluble alkali complexing agent.

Throughout this specification, the term "a soluble alkali complexing agent" is used to refer to a soluble alkali compound that can form a complex with arsenic or other group VA elements or compounds. The complex may comprise a short-lived complex that can subsequently migrate away from the reacting surface and then precipitate.

In some embodiments of the method of the present invention, limestone is present in the leaching step. It is not necessary to add lime to obtain satisfactory leaching. This is somewhat surprising as conventional wisdom has it that limestone produces leaching conditions that are too mild to effectively leach the mineral composition.

In some embodiments of the present invention, the leaching step is operated at a pH of from 3.5 to 6. The pH is controlled to maximise the solubility of the soluble complex. In some embodiments, the leaching step is conducted at a pH of from 4.0 to 6, more preferably from 4.4 to 6, even more preferably from 4.4 to 5.5, even more preferably from 4.4 to 5.8, or about 4.4, or about 4.8, or about 5.5. In other embodiments, the leaching step is operated at a plurality of sequential pH setpoints, for example, with leaching initially operated at pH 3.5, then at pH 4, then at pH 6. The sequential pH setpoints may be selected from pH values in the range between 3.5 and 6.

In embodiments where limestone is added, addition of limestone is controlled such that the pH falls within the ranges specified above.

The complexing agents would typically be soluble alkalis such as sodium, potassium, magnesium or ammonium hydroxide or carbonate, or other forms of soluble carbonate or hydroxide, along with carbon dioxide gas.

In some embodiments, the method of the present invention is used to treat refractory gold bearing mineral compositions that also include arsenic or arsenic compounds. The mineral composition may also contain iron. In the present specification and claims the term "refractory material" includes refractory sulfides such as pyrite in which precious metals are encapsulated, ores which contain carbonaceous material and telluride or selenide materials. In the present specification and claims, the use of the term "ore" Includes not only ore per se but also includes concentrates, slimes, tailings, spoil and waste materials which may have a recoverable amount of precious metal values. Carbonaceous material refers to materials having an organic carbon fraction which may include graphite, bituminous or partly bituminous material.

Other non-iron or minor iron containing materials may also be present in the composition, examples of which include stibnite, tetrahedrite, argentopyrite, calaverite, altaite, gold bearing selenides, tennantite and pentlandite. The method of the present invention is also applicable to a composition including carbonaceous matter, where the carbonaceous matter would otherwise interfere with the precious metals recovery process. Suitably the composition would not include economic amounts of base metal sulphides containing copper or zinc.

The method of the present invention is in particular directed towards the treatment of refractory materials containing precious metals such as gold, silver and platinum. Suitably, the refractory materials are in the form of flotation concentrates although the method is suitable for ores if the economics are favourable.

In the method of the present invention, the composition is finely ground to a particle size of 80% by mass passing less than 25 μm. A typical particle size range is between 80% passing 2-25 μm and preferably between about 80% passing 2-15 μm.

A preferred apparatus for producing the finely ground material is a stirred ball mill or a horizontal shaft stirred mill. However, it will be appreciated that several other suitable types of comminution apparatus may also be used.

The method of the present invention can be carried out at ambient pressure. This avoids the use of expensive pressure reactors and autoclave equipment. The preferred operating temperature in the leaching step is between about 50° C. up to the boiling point of the mixture. Typically the maximum temperature is about 98° C.

As the present invention can be operated at ambient pressure, it is not necessary to conduct the leaching step in expensive pressure vessels. Indeed, in some embodiments, the leaching reaction can be carried out in open tank reactors. Excess heat may be removed by evaporation of the solution. This avoids the need for costly heat exchangers. If necessary, heat can be easily introduced by known methods such as the injection of steam.

The leaching reaction is carried out in the presence of an oxygen containing gas. When the reaction is carried out at ambient pressure the gas is typically introduced by sparging. The gas may be oxygen, air or oxygen enriched air. The gas flow is dependent upon the amount of oxygen required to sustain the leaching reaction.

After the composition has been leached, the mixture can be further treated by known methods to recover precious metals, principally by cyanide leaching. If desired the slurry may be thickened prior to cyanide leaching.

The present inventors have now surprisingly found that arsenic containing mineral compositions and even refractory mineral compositions that contain arsenic or Group VA elements can be treated with greater success by conducting a leaching step at a pH of between 3.5 and 6 in the presence of an oxygen containing gas. Without wishing to be bound by theory, the present inventors believe that conducting a process similar to the present process on mineral compositions that contain appreciable quantities of arsenic or arsenic containing compounds or other Group VA elements or compounds using a leach liquor that contains oxygen containing gas and alkali material at a pH of greater than 6 rapidly results in arsenic compounds or Group VA compounds passivating the surface of the mineral particles. In contrast, operating the process at a pH of from 3.5 to 6, more preferably 3.5 to 5, with use of a complexing agent, such as a soluble sodium alkali or other soluble alkali material, results in the formation of a soluble arsenic or Group VA intermediate that migrates away from the leaching mineral and precipitates out of solution away from the mineral. This reduces or avoids passivation of the mineral surface. It is believed that the arsenic-containing intermediates remain relatively soluble close to the mineral surface at a pH of from 3.5 to 5-6, prior to migration and precipitation in the bulk solution or slurry. In some embodiments, addition of a complexing agent that forms a complex with the soluble arsenic or Group VA intermediates assists in keeping the arsenic in solution for longer, allowing further time for the soluble intermediates to move away from the mineral particles before precipitating.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

EXAMPLES

Example 1

Armenian Refractory Concentrate

A sample of refractory sulphide concentrate of the following composition was used for the testwork:

| | |
|---|---|
| Arsenic % | 4.5 |
| Antimony % | 0.5 |
| Iron - % | 22 |
| Sulphide - % | 22 |
| Au - g/t | 55 |
| Ag - g/t | 57 |
| Te - g/t | 155 |

Micrographic analysis was carried out on the concentrate sample to identify the major gold deportment, and this is summarised below:

| | |
|---|---|
| FREE/CYANIDABLE GOLD | 48.2 |
| TELLURIDE LOCKED GOLD | 5.25 |
| CARBONATE LOCKED GOLD | 3.36 |
| ARSENICAL MINERAL (ARSENOPYRITE) | 42.21 |
| PYRITIC SULPHIDE MINERAL | 0.6 |
| SILICATE (GANGUE) ENCAPSULATED | 0.3 |

The majority of the gold within the sample was housed in arsenic sulphide phases The sample was then milled in a horizontally stirred bead mill to an 80% passing size of 11.5 microns.

A series of tests were then carried out on the sample under the following set of conditions:

| Test No | Control pH | Temperature (° C.) | Duration—hrs | Level of Sulphide Oxidation—% | NaOH addition (kg/tonne) | CaCO$_3$ addition (kg/tonne) |
|---|---|---|---|---|---|---|
| 1 | 5.5 | 95 | 48 | 87.6 | 0 | 181 |
| 2 | 5.5 | 95 | 48 | 95.8 | 10 | 176 |
| 3 | 5.5 | 95 | 48 | 73.4 | 15 | 128 |
| 4 | 5.5 | 95 | 48 | 77.8 | 20 | 132 |

The level of sodium hydroxide addition was varied for all tests to improve selective oxidation of the arsenic sulphide phases.

The sodium hydroxide and limestone were added progressively to all tests to control the pH to the required setpoint. On completion of the tests, the oxidised slurry was filtered.

The filter cake from each oxidation test was re-slurried in tap water to level of 40% solids and then leached for 24 hours in a 500 ppm NaCN solution, with the pH held at 10 using hydrated lime. Activated carbon was added at the start of the test. On completion of the test, the cyanide leach slurry was filtered, and the final filter cake, solution and carbon phases analysed for gold and silver to determine recovery.

A summary of the results of the testwork is presented in Table 2, below:

TABLE 2

Testwork Results - Armenian Refractory Concentrate

| Test ID | Au Recovery % |
|---|---|
| 1 | 88.9 |
| 2 | 93.1 |
| 3 | 95.0 |
| 4 | 95.5 |

The addition of the sodium alkali to tests 2-4 resulted in superior gold recovery from the oxidised residue, due to improved oxidation of the arsenic rich gold phases. These improved gold recoveries were also achieved at lower overall levels of sulphide oxidation.

Example 2

Central American Refractory Concentrate

A sample of refractory sulphide concentrate of the following composition was used for the testwork:

| | |
|---|---|
| Arsenic % | 11.02 |
| Iron - % | 38.4 |
| Sulphide - % | 36.8 |
| Au - g/t | 32 |
| Ag - g/t | 61 |

The sample consisted of predominantly arsenopyrite and pyrite. The sample was milled in a horizontally stirred bead mill to an 80% passing size of 9.7 microns.

Two tests were then carried out on the sample at varying control pH levels. The pH levels of 5.2 and 5.5 were tested. Arsenic solubility, while very low across this entire pH range, is marginally higher at a pH of 5.2 relative to 5.5, and so the improved complexing of arsenic and migration of the arsenic complex away from the leaching surface at the lower pH was expected to translate to an improved overall oxidation rate. The conditions for the two tests are outlined below:

| Test No | Control pH | Temperature (° C.) | Duration—hrs | Level of Sulphide Oxidation—% | NaOH addition (kg/tonne) | CaCO$_3$ addition (kg/tonne) |
|---|---|---|---|---|---|---|
| 1 | 5.5 | 95 | 48 | 41 | 61 | 346 |
| 2 | 5.2 | 95 | 50 | 62 | 90 | 790 |

The sodium hydroxide and limestone were added progressively to all tests to control the pH to the required setpoint. The reduction of the pH to 5.2 from 5.5-6 resulted in a 50% increase in the rate of oxidation of the sulphide minerals.

On completion of the tests, the oxidised slurry was filtered.

The filter cake from each oxidation test was re-slurried in tap water to level of 40% solids and then leached for 24 hours in a 500 ppm NaCN solution, with the pH held at 10 using hydrated lime. Activated carbon was added at the start of the test. On completion of the test, the cyanide leach slurry was filtered, and the final filter cake, solution and carbon phases analysed for gold and silver to determine recovery.

A summary of the results of the testwork is presented in Table 2, below:

TABLE 2

Testwork Results - Central American Refractory Concentrate

| Test ID | Au Recovery % | Ag Recovery % |
|---|---|---|
| 1 | 90.8 | 92.9 |
| 2 | 90.9 | 97.7 |

The arsenic phase that will form and precipitate on the leaching mineral surface will be scorodite under the leaching conditions employed. Data on the solubility of scorodite in the pH range tested has been reported [P. M. Dove and J. D. Rimstidt. *Am. Miner.* 70, 838-844 (1985)]. At the two pH ranges tested, the arsenic solubilities are expected to be:

pH 5.2=0.8 mmol/L
pH 5.5=0.1 mmol/L

The control of the pH in Test 2 to a level where the arsenic solubility while still very low, was optimized, resulted in a 50% increase in the oxidation rate within the oxidative leach test.

Example 3

Mexican Refractory Concentrate

A sample of refractory sulphide concentrate of the following composition was used for the testwork:

| | |
|---|---|
| Arsenic % | 14.4 |
| Iron - % | 37.1 |
| Sulphide - % | 33.2 |
| Au - g/t | 18.4 |
| Ag - g/t | 18.2 |

The majority of the gold within the sample was housed in arsenopyrite.

The sample was then milled in a horizontally stirred bead mill to an 80% passing size of 10 microns.

A series of tests were then carried out on the sample under the following set of conditions:

| Test No | Control pH | Temperature (° C.) | Duration—hrs | Level of Sulphide Oxidation—% | NaOH addition (kg/tonne) | CaCO$_3$ addition (kg/tonne) |
|---|---|---|---|---|---|---|
| 1 (8) | 5.5 | 95 | 51 | 39 | 0 | 107 |
| 2 (1) | 5.5 | 95 | 49 | 65 | 49 | 179 |
| 3 (4) | 5.5 | 95 | 48 | 52 | 96 | 106 |

The level of sodium hydroxide addition was again varied for the three tests to improve selective oxidation of the arsenic sulphide phases.

The sodium hydroxide and limestone were added progressively to all tests to control the pH to the required setpoint. On completion of the tests, the oxidised slurry was filtered.

The filter cake from each oxidation test was re-slurried in tap water to level of 40% solids and then leached for 24 hours in a 500 ppm NaCN solution, with the pH held at 10 using hydrated lime. Activated carbon was added at the start of the test. On completion of the test, the cyanide leach slurry was filtered, and the final filter cake, solution and carbon phases analysed for gold and silver to determine recovery.

A summary of the results of the testwork is presented in Table 2, below:

TABLE 2

Testwork Results - Mexican Refractory Concentrate

| Test ID | Au Recovery % |
|---|---|
| 1 | 48.6 |
| 2 | 83.6 |
| 3 | 84 |

The addition of the sodium alkali to tests 2 and 3 again resulted in superior gold recovery from the oxidised residue, due to improved oxidation of the arsenic rich gold phases.

Example 4

New Zealand Refractory Concentrate

A sample of refractory sulphide concentrate of the following composition was used for the testwork:

| | |
|---|---|
| Arsenic % | 11.3 |
| Iron - % | 27.0 |
| Sulphide - % | 24.2 |
| Au - g/t | 56.9 |
| Ag - g/t | 2.0 |

The sample consisted of predominantly arsenopyrite and pyrite. The sample was milled in a horizontally stirred bead mill to an 80% passing size of 6.0 microns.

Ten tests were then carried out on the sample at varying control pH levels. The pH levels of 4.4, 4.8 and 5.5 were tested. Arsenic solubility, while very low across this entire pH range, is marginally higher at a pH of 4.8 relative to 5.5, and so the improved complexing of arsenic and migration of the arsenic complex away from the leaching surface at the lower pH was expected to translate to an improved overall oxidation rate. The conditions for the tests are outlined below:

| Test No | Control pH | Temperature (° C.) | Duration—hrs | Level of Sulphide Oxidation—% | $Na_2CO_3$ addition (kg/tonne) | $CaCO_3$ addition (kg/tonne) | Specific Rate constant |
|---|---|---|---|---|---|---|---|
| 2 | 5.5 | 90 | 10.5 | 19 | 0 | 150 | 0.08 |
| 8 | 4.8 | 90 | 12 | 22 | 38 | 165 | 0.24 |
| 9 | 4.4 | 90 | 12 | 21 | 38 | 167 | 0.17-0.24 |
| 10 | 4.8 | 90 | 48 | 63 | 38 | 428 | 0.20 |

The sodium carbonate and limestone were added progressively to all tests to control the pH to the required setpoint. The reduction of the pH to 4.8 from 5.5 resulted in a 50% increase in the rate of oxidation of the sulphide minerals.

On completion of the tests, the oxidised slurry was filtered.

The level of sodium carbonate addition was proportional for all tests to improve selective oxidation of the arsenic sulphide phases.

The arsenic phase that will form and precipitate on the leaching mineral surface will be scorodite under the leaching conditions employed. Data on the solubility of scorodite in the pH range tested has been reported [P. M. Dove and J. D. Rimstidt. Am. Miner. 70, 838-844 (1985)]. At the two pH ranges tested, the arsenic solubilities are expected to be:

pH 4.4=0.8 mmol/L
pH 4.4=0.8 mmol/L
pH 5.5=0.1 mmol/L

The control of the pH in Test 10 to a level where the arsenic solubility while still very low, was optimized, resulted in a 50% increase in the oxidation rate within the oxidative leach test.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for treating a mineral composition containing iron, arsenic or other Group VA compounds comprising milling the mineral composition to a particle size of $P_{80}$ of less than 25 µm and leaching said mineral composition in the presence of lime and/or limestone and a soluble alkali complexing agent in the presence of an oxygen containing gas at a pH in the range of from 3.5 to 6.

2. A method as claimed in claim 1 wherein a second complexing agent forms a soluble complex with iron, arsenic or other Group VA compounds during the leaching.

3. The method of claim 2 wherein the second complexing agent is selected from the group consisting of soluble alkalis, soluble carbonates, soluble hydroxides, and carbon dioxide gas.

4. A method as claimed in claim 1 wherein the soluble alkali complexing agent forms a soluble complex with iron, arsenic or other Group VA compounds during the leaching.

5. The method of claim 1 wherein limestone is present during the leaching and lime is not added during the leaching.

6. The method of claim 1 wherein the soluble alkali complexing agent comprises a soluble carbonate or soluble hydroxide selected from the group consisting of sodium hydroxide, potassium hydroxide, magnesium hydroxide, ammonium hydroxide, sodium carbonate, potassium carbonate, magnesium carbonate, and ammonium carbonate.

7. The method of claim 1 wherein the mineral composition comprises a refractory material containing precious metals.

8. A method as claimed in claim 7 wherein the refractory material comprises:
   (a) refractory sulfides in which precious metals are encapsulated;
   (b) ores which contain carbonaceous material and telluride materials; or
   (c) ores which contain carbonaceous material and selenide materials.

9. The method of claim 7 wherein the mineral composition also contains one or more of stibnite, tetrahedrite, argentopyrite, calaverite, altaite, gold bearing selenides, tennantite and pentlandite, or the mineral composition comprises a composition including carbonaceous matter, where the carbonaceous matter would otherwise interfere with the precious metals recovery process.

10. The method of claim 9 wherein the refractory material comprises flotation concentrates.

11. The method of claim 1 wherein the composition is finely ground to a particle size range of 80% passing 2-25 µm, or about 80% passing 2-15 µm.

12. The method of claim 1 wherein the method is carried out at ambient pressure.

13. The method of claim 1 wherein the leaching is conducted at a temperature of between about 50° C. up to the boiling point of the mixture.

14. A method as claimed in claim 13 wherein the leaching conducted at a temperature of between about 50° C. up to about 98° C.

15. The method of claim 13 wherein the leaching is carried out in the presence of an oxygen containing gas selected from oxygen, air or oxygen enriched air.

16. The method of claim 1 wherein after the composition has been leached, the mixture is further treated to recover precious metals.

17. The method of claim 1 wherein the soluble alkali complexing agent comprises a soluble alkali compound that forms a complex with arsenic or other group VA elements or compounds, the complex comprising a short-lived complex that subsequently migrates away from particles of the mineral composition and then precipitates.

* * * * *